Figure 1:
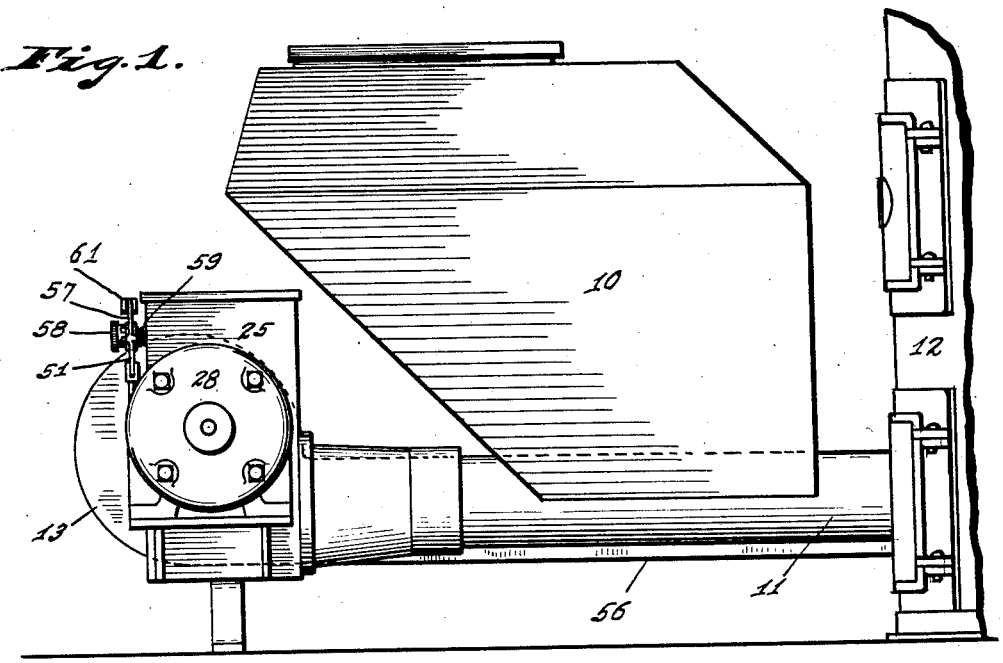

Dec. 18, 1934.  A. E. WEAVER  1,985,123
STOKER DRIVE
Filed March 18, 1932   3 Sheets-Sheet 1

Inventor
ALBERT E. WEAVER,

By
Attorneys

Dec. 18, 1934.  A. E. WEAVER  1,985,123

STOKER DRIVE

Filed March 18, 1932   3 Sheets-Sheet 2

Inventor
ALBERT E. WEAVER,

By
Attorneys

Dec. 18, 1934.  A. E. WEAVER  1,985,123
STOKER DRIVE
Filed March 18, 1932  3 Sheets-Sheet 3
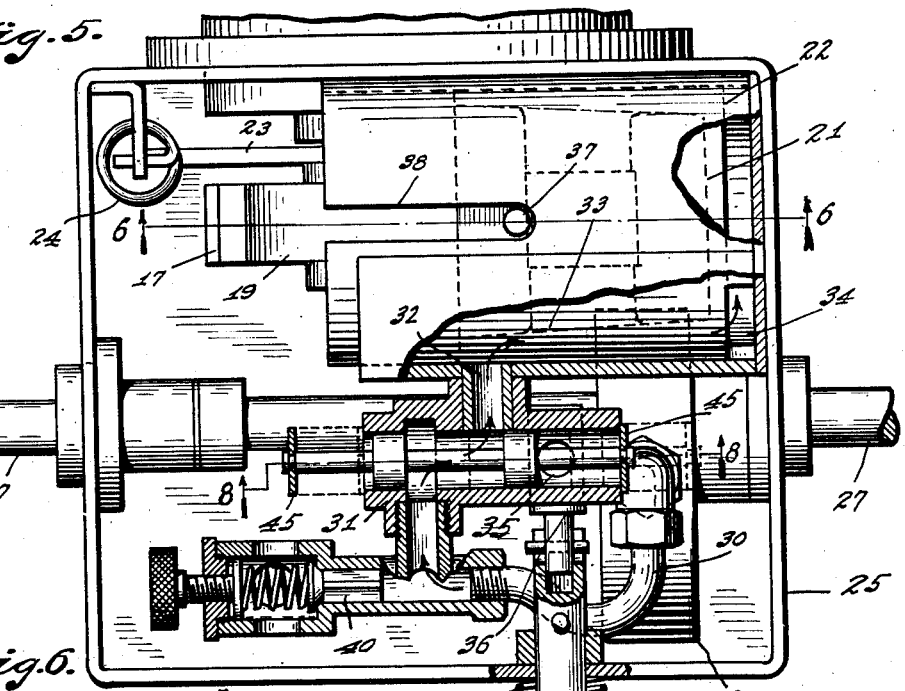
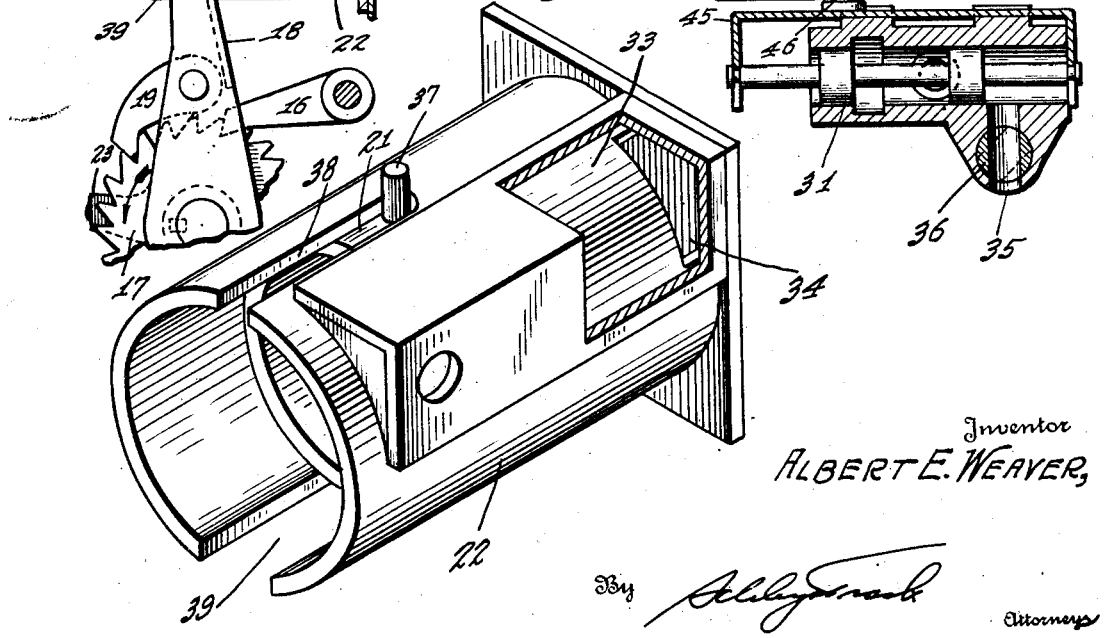
Inventor
ALBERT E. WEAVER,
By
Attorneys Patented Dec. 18, 1934

1,985,123

UNITED STATES PATENT OFFICE 1,985,123

STOKER DRIVE

Albert E. Weaver, Indianapolis, Ind.

Application March 18, 1932, Serial No. 599,643

8 Claims. (Cl. 60—52)

My invention relates to a drive for furnace stokers and to a power transmission device adapted for embodiment therein.

It is the primary object of my invention to provide a power transmission mechanism, preferably hydraulic in nature, which will have a wide flexibility of control. It is a further object of my invention to provide such transmission or operating mechanism which may be controlled by conditions at a distant point, as for instance weather conditions. It is a further object of my invention to provide a complete stoker operating unit which will be simple and inexpensive in manufacture, quiet and efficient in operation, rugged, and long lived with a minimum of attention; and which will contain all its parts in a compact arrangement and within a casing that will receive all hydraulic liquid used by and discharged from the mechanism, and will protect such mechanism from the entrance of dirt or the loss of liquid.

In accomplishing the objects of my invention, I provide a source of oil supply, and a suitably driven pump to pump oil from the source of supply and deliver it under pressure through suitable valve mechanism to a cylinder in which is slidably mounted a piston. The piston is operatively connected to the conveyor of the stoker, conveniently a screw-conveyor, and arranged to move the feed screw forward during piston travel in one direction. The valve mechanism above referred to is arranged to operate in response to piston movement and to deliver oil under pressure to move the piston through its screw-operating stroke, and when the piston reaches the end of that stroke to cut off the supply of oil and relieve the pressure, and permit the piston to move in the opposite direction. The force exerted by the piston to operate the feed screw may be limited by including in the oil supply line a suitable relief valve.

The rate at which the feed screw is operated by my mechanism may be controlled by a valve regulating oil flow either to or from the cylinder. This valve may be thermostatically operated, and I desirably arrange the thermostat valve operating device to be responsive to weather conditions.

I may also provide a blower in association with my stoker drive, and may operate such blower jointly with the pump of the drive mechanism. In addition, the supply of air delivered to the furnace may be controlled by a suitable valve operated jointly with the temperature-responsive control valve of my feed screw operating mechanism.

Figure 2:
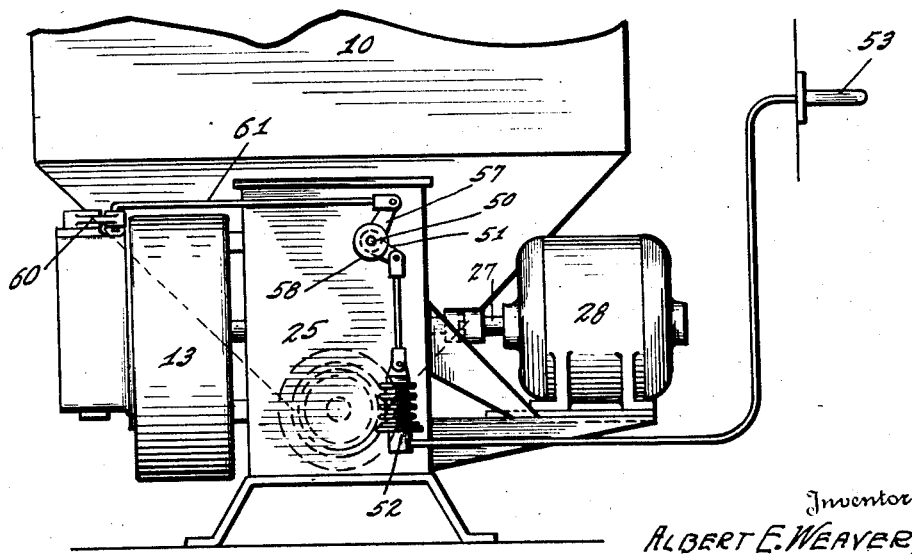
Figure 3:
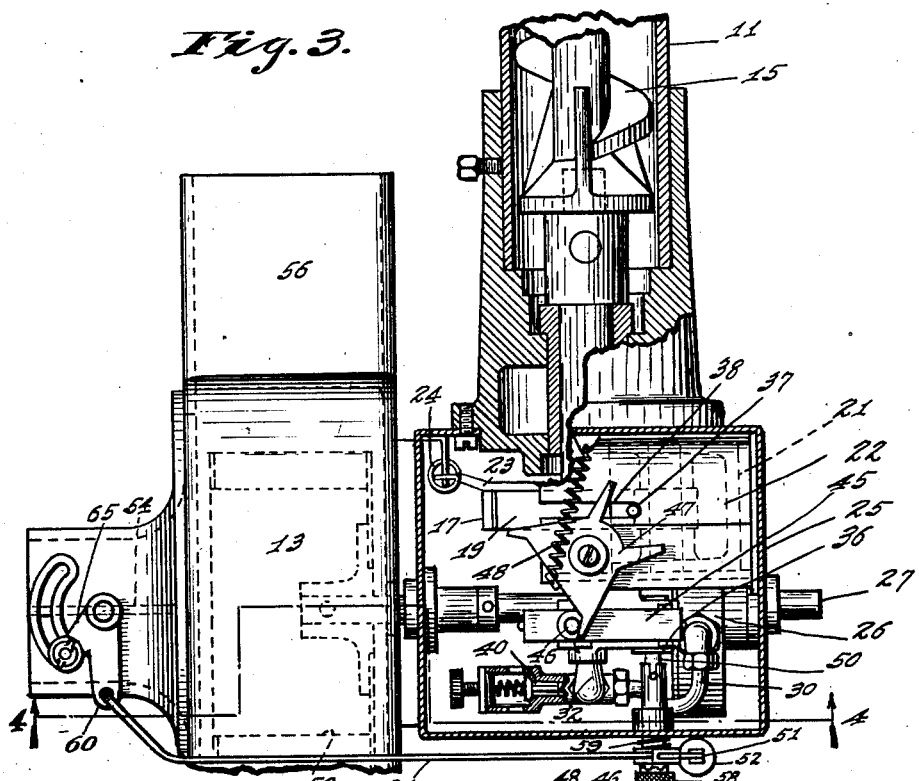
Figure 4:
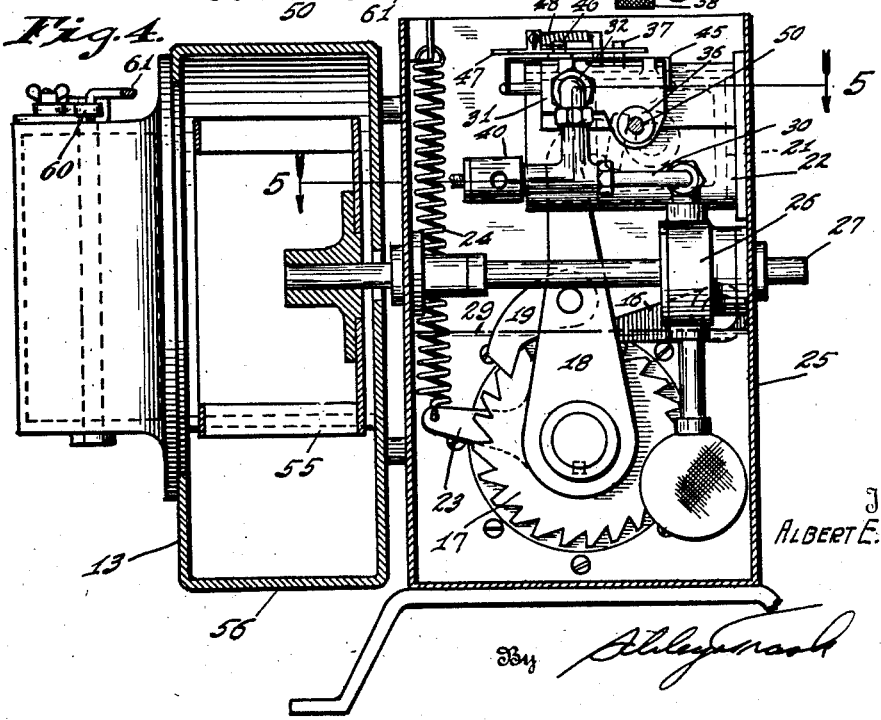

The accompanying drawings illustrate my invention: Fig. 1 is a side elevation of a furnace stoker embodying my invention; Fig. 2 is an end elevation of the same stoker; Fig. 3 is a plan of an operating mechanism and blower embodying my invention with parts surrounding the feed screw shown in section; Fig. 4 is a vertical section taken on the line 4—4 of Fig. 3, showing the mechanism of my operating device in end elevation; Fig. 5 is a section taken substantially on the line 5—5 of Fig. 4; Fig. 6 is a section taken on the line 6—6 of Fig. 5, showing the piston and operating arm arrangement; Fig. 7 is an isometric view of the cylinder and oil supply passage; and Fig. 8 is a section taken on the line 8—8 of Fig. 5 showing a three-way valve for controlling the oil flow to and from the cylinder.

A furnace stoker usually comprises a hopper 10 for containing a quantity of fuel, a fuel passage 11 leading from such hopper to the grate (not shown) of a furnace 12, and means for forcing the fuel through the fuel passage 11. Often, there is associated with the stoker a blower 13 for supplying air under pressure to the grate. As shown, the means for forcing the fuel through the fuel supply passage is a screw conveyor 15.

The stoker parts thus far described are common in the art; and it is the usual practice to drive the screw conveyor by connecting it either directly or through suitable gearing to a motor.

By my invention, I substitute for the direct or gear-connection between the screw and a motor, a hydraulic driving connection or transmission. In this hydraulic driving mechanism, a shaft operatively connected to the feed screw 15 fixedly carries a ratchet wheel 17. Loosely mounted on this same shaft and embracing the ratchet wheel is a yoke-arm 18 equipped with a pawl 19 arranged to engage the ratchet teeth upon movement of the arm 18 in counter-clockwise direction. On the end of the arm 18 there is a head 20 arranged to engage a piston 21 mounted in a cylinder 22. As shown, the piston will operate to move the arm in only one direction. To move the arm in the other direction, or clockwise, there is provided a spring 24 anchored at one end and connected at the other end to a finger 23 on such arm 18. Backward movement of the ratchet wheel may be prevented by a second pawl 16 pivotally mounted on a fixed pivot and in position to engage the teeth on the ratchet wheel 17.

The piston is operated hydraulically; and for this purpose I provide a supply of oil, conveniently in the bottom of a casing 25 which encloses the ratchet wheel 17 and the other mechanism of the transmission. The oil level is shown in Fig. 4 by a broken line 29. An oil pump 26 is mounted within this casing with its inlet opening submerged in the oil supply, and is drivingly connected by a shaft 27 to a motor 28 situated outside the casing, which motor is conveniently a constant speed motor. The oil pump 26 supplies oil under pressure through a pipe 30 to a three-way valve 31, which is operable either to direct the flow of oil through a pipe 32 and an oil passage 33 to a port 34 in the cylinder 22, or to discharge the oil and allow it to fall back to the oil supply at the bottom of the casing 25. When the three-way valve is in position to discharge the oil, as shown in dotted lines in Fig. 5, it also provides communication from the pipe 32 to an outlet conduit 35 in which is provided a control valve 36.

The cylinder 22 and oil passage 33 assembly is conveniently of welded construction. In this construction, the cylinder proper, with a notch cut out at one end to provide the port 34, is welded at its end against a flat plate. The oil passage 33 is provided by welding an angle iron to the outside of the cylinder proper and to the end plate, in position to overlie the notch which provides the port 34. The end of such angle iron which lies away from the plate is closed by welding to the angle iron and the cylinder a suitable triangular shaped piece of metal. A hole drilled through one of the flanges on the angle iron provides for mounting the pipe 32 in communication with the oil passage 33 between the angle iron and the cylinder.

The piston 21 is prevented from rotating within the cylinder by means of a pin 37 carried by the piston and extending through a slot 38 in the upper side of the cylinder 22. In addition to this slot 38 in the cylinder 22 there is also a slot 39 at the bottom of the cylinder to permit the arm 18 to follow the piston to its limit of movement.

The pin 37, in addition to preventing rotation of the piston 21, serves to operate the three-way valve 31. To this end, the ends of the stem of the three-way valve are engaged by a yoke 45 which carries a lug 46; and the pin 37 on the piston 21 and the lug 46 of the valve-yoke 45 are operatively interconnected by means of a spider 47 having a wide notch at each end and pivotally mounted in a position where the two wide notches embrace the pin 37 and the lug 46 respectively. The notches in the spider 47 are wide, to permit plenty of lost motion, and the spider has associated with it a spring 48 in position to snap it to an extreme position after it has been carried past a dead center by the pin 37 on the piston.

When the spider 47 is in the position shown in Fig. 3, the valve 31 will be in the position shown in Figs. 5 and 8. If the motor is put in operation when the parts are in this position, oil under pressure will flow from the pump 26 through the pipe 30, the valve 31, the pipe 32, and the oil passage 33 into the cylinder 22 by way of the port 34 to behind the piston. The force exerted by such oil in the cylinder will force the piston to the left, and the piston in turn will move the arm 18 in a counter-clockwise direction. During such movement of the arm 18, its pawl 19 will engage one of the teeth on the ratchet wheel 17 and rotate the screw 15 to force fuel into the furnace. As the piston 21 moves to the left on this working stroke, the pin 37 will engage the side of its associated notch in the spider 47 and will move the spider in a counter-clockwise direction, (referring to Fig. 3). When the spider reaches dead-center the spring 48 will snap it to an opposite position, and in doing so will move the three-way valve to the position shown in dotted lines in Fig. 5.

With the valve in this position the oil from the pump will be discharged and allowed to drop back into the oil supply; and the oil in the cylinder will be allowed to flow back through the oil passage 33 and the oil pipe 32 into the outlet conduit 35 from which it will be discharged back to the source of supply. The piston return-movement to the right is produced by the spring 24 urging the arm 18 in a clockwise direction. In the device shown in the drawings, this movement of the arm 18 in a clockwise direction has no effect on the feed screw 15.

In order to prevent any breakage of the parts of my operating device for the feed screw 15 in the event such feed screw becomes jammed or is otherwise prevented from rotating, I provide in the oil line conveniently between the pump and the three-way valve 31 a relief valve 40, spring pressed toward closed position, but with adjusting means for the spring to permit the valve to be set to open at any predetermined maximum pressure. With such a relief valve present, if the feed screw 15 becomes jammed and the piston 21 is thereby prevented from moving throughout a working stroke so that the pressure in the oil line between the pump and the cylinder becomes excessive and exceeds the predetermined maximum, the relief valve will be opened and will allow oil to escape back to the oil supply. The pressure will remain at the predetermined maximum, however, and should the feed screw 15 become free to turn, the relief valve will close and normal operation of the device will continue.

In stokers of the type illustrated there are usually two means of control. One of these is a thermostatic control responsive to the temperature of a room heated by the furnace, which turns the motor off or on in accordance with fluctuations of that room temperature. The other of these controls is a manual control to vary the speed of fuel feeding when the stoker is in operation, in accordance with requirements imposed by weather conditions. In a stoker embodying my invention, the room temperature responsive control may be of any desired type. However, instead of a manual speed-control, I desirably provide an automatic speed control.

This speed control may be obtained by controlling the flow of oil either during its passage from the oil supply through the pump and to the cylinder or during its escape from the cylinder during the return stroke of the piston. I prefer the latter method, and for this purpose the discharge conduit 35, through which oil is discharged from the cylinder, is provided with a control valve 36. The regulation of this control valve 36 will control the rate at which oil is permitted to escape from the cylinder during the return stroke of the piston, and the cylinder and piston will act as a dashpot to regulate the time required for this return stroke to be completed. By this arrangement, the successive working strokes of the piston will take place under the full oil pressure generated by the oil pump, but the intervals between those successive working strokes will depend upon the position of the control valve 36.

Automatic regulation of the valve 36 may be obtained by associating with that valve a temperature responsive device 52 having its temperature responsive element 53 located outside the building being heated, where it is exposed to atmospheric temperature. For operatively connecting the valve 36 to the temperature responsive device 52, an operating rod 50 extends from the valve 36 through the casing 25 and has on its outer end a knob 58. Associated with this knob 58, and loosely and slidably mounted on the rod 50, is a bell-crank having two arms 51 and 57; and the bell-crank and knob have co-operating clutch teeth yieldingly held in engagement by a spring 59. The temperature responsive device 52 is operatively connected to the arm 51 of this bell-crank, so that the action of the temperature responsive device 52 will turn the operating rod 50 and thus change the position of the valve 36. The purpose of the arm 57 of the bell-crank will appear later.

My stoker drive may have associated with it the blower 13 arranged to supply air through a conduit 56 to the furnace 12, and I desirably operate such blower jointly with the oil pump of the operating mechanism. This may be done conveniently by extending the shaft 27 of the motor 28 on through the casing 25 and by mounting the rotor of the blower on the end of such shaft 27. Associated with the blower, there is desirably a valve, such as a damper valve 54, to regulate the quantity of air supplied to the furnace by the blower. Conveniently, such valve is mounted in the inlet opening to the blower, and is operated jointly with the valve 36.

For this purpose, the shaft of the valve 54 may be provided with an arm 60 having in its outer end a vertical hole adapted to loosely receive the down-turned end of an operating rod 61 which is connected to the arm 57 of the bell-crank on the operating rod 50 for the valve 36. The connection between the arm 60 on the shaft of the damper valve 54 and the arm 61 is made thus readily disconnectible, to permit the damper valve 54 to be operated independently of the valve 36 and the temperature responsive device 52, during such times as when a fire is being lighted in the furnace.

The damper valve may also be equipped with means for locking it in a fixed position of adjustment; and for this purpose I have shown in Fig. 3 an arm 65 fixed to the shaft of the damper valve, and carrying at its free end a stud projecting through a fixed arcuate slot and with a thumb-nut on its end for locking it in any position along the arcuate slot.

It is to be noted that the casing 25 encloses substantially all the working parts of my stoker drive, and particularly all of the oil flow passages, so that any oil which leaks either from around the piston 21, from the valve, or the oil conduits, will drop back into the supply of oil at the bottom of the casing. This arrangement minimizes the necessity for accurate and close fitting of such parts as the piston 21 and the moving parts of the three-way valve 31; and makes possible reductions in the costs of manufacture, as well as increasing the life of the stoker drive.

In preparing to start a fire in a furnace equipped with a stoker embodying my invention, the damper valve of the blower is disconnected from the automatic control device by lifting the operating rod 61 out of engagement with the arm 60, and is set in any desired position by means of the thumb nut; and the control valve 36 disconnected from the temperature responsive device 52 by pushing the bell crank on the operating rod 50 out of engagement with the knob 58, is turned manually to a complete "off" position. The motor 28 is then started to operate the blower 55 and a fire is lighted in the usual manner. When the fire has been started, the valve 36 is manually turned to an "on" position and the spring 59 is allowed to force the clutch teeth between the bell-crank and the knob 58 into engagement, and the operating rod 61 is connected to the arm 60 to operate the damper valve. The stoker drive will then be under the automatic control of the temperature responsive device 52, and the oil pump 26 will supply oil to operate the piston 21 and thus through the yoke-arm 18 and the rachet wheel 17 to operate the feed screw 15. Each successive working stroke of the piston will take place under the full oil pressure generated by the pump 26, so that the screw 15 will be moved in a series of positive forward steps; but the control valve 36 will regulate the movement of the piston to adjust the interval between those successive forward steps of the feed screw, and thus regulate the rate of fuel feeding.

If any obstruction clogs the feed screw 15 and prevents its forward movement, the piston 21 will be prevented from completing a working stroke, and the oil pressure tending to force the piston through its operating stroke will be increased. If and when this oil pressure reaches the maximum predetermined by the setting of the relief valve 40, that valve 40 will be opened to spill oil back to the source of supply and prevent any further increase of oil pressure. If the obstruction works itself loose or is otherwise removed, the piston 21 will be permitted to proceed through the uncompleted working stroke, the oil pressure will be reduced, and the relief valve will automatically close; and the normal operation of the stroke will be resumed.

I claim as my invention:

1. In combination, a rotatable driven member, a hydraulic pump having a substantially constant discharge rate, and means operated by said pump for rotating said driven member, said means comprising a reciprocable member having a stroke of constant length, a one-way drive connection between said reciprocable and rotatable members, a hydraulic motor for moving said reciprocable member in a driving direction, means operable upon completion of a non-driving stroke of said reciprocable member for establishing the operating supply of liquid from said source to said motor, means operative upon completion of a driving stroke of the reciprocable member for venting said pump, yielding means for moving said reciprocable member through a non-driving stroke, and means for opposing the non-driving movement of said reciprocable member, said last-named means being adjustable for regulating the duration of each non-driving stroke of said reciprocable member with respect to the duration of its driving strokes.

2. In combination, a reciprocable member having a stroke of constant extent, a source of liquid under pressure discharging at a substantially constant rate, a hydraulic motor operable upon receipt of a predetermined quantity of liquid from said source for moving said reciprocable member through a full stroke in the forward direction, means operable upon the completion of each such stroke for venting said discharge of liquid, biasing means for moving said reciprocable member through a full stroke in the reverse direction, means operable upon the completion of each stroke in the reverse direction for establishing the operating supply of fluid from said source to said motor, means for opposing movement of said reciprocable member in the reverse direction, said last-named means being adjustable to regulate the rate of such movement of said reciprocable member with respect to its rate of movement in the forward direction, and a driven member operatively connected to said reciprocable member.

3. In combination, a driven shaft, a hydraulic pump arranged to deliver liquid at a substantially constant rate, and means operable by said constant flow of liquid for moving said driven shaft through a controlled aggregate extent in a given time, said means comprising a reciprocable arm, a one-way drive connection between said arm and shaft, a piston reciprocable in a cylinder and arranged to move said arm through a power stroke during outward movement, spring means urging said arm against said piston to effect return movement thereof, liquid flow controlling means including a valve and arranged to connect said cylinder with said pump when said valve is in one position and to connect said cylinder to an exhaust passage and vent said pump when the valve is in another position, a snap-action device synchronized with piston movement to move said valve to its first named position upon completion of a piston return stroke and to its other position upon completion of a piston power stroke, and an adjustable valve in said exhaust passage to regulate the release of liquid from said cylinder.

4. In combination, a driven shaft, a hydraulic pump arranged to deliver liquid at a substantially constant rate, and means operable by said constant flow of liquid for moving said driven shaft through a controlled aggregate extent in a given time, said means comprising a reciprocable arm, a one-way drive connection between said arm and shaft, a piston reciprocable in a cylinder and arranged to move said arm through a power stroke during outward movement, spring means urging said arm against said piston to effect return movement thereof, an exhaust passage for said cylinder, automatic valve means arranged to effect a cyclic operation in each cycle of which said piston is moved through a power stroke by liquid from said pump and then said pump is vented and said cylinder connected to said exhaust passage, and an adjustable valve in said exhaust passage to regulate the release of liquid from said cylinder.

5. In combination, a driven shaft, a hydraulic pump arranged to deliver liquid at a substantially constant rate, and means operable by said constant flow of liquid for moving said driven shaft through a controlled aggregate extent in a given time, said means comprising a reciprocable arm, a one-way drive connection between said arm and shaft, a piston reciprocable in a cylinder and arranged to move said arm through a power stroke during outward movement, yielding means for returning said arm and piston, an exhaust passage for said cylinder, automatic valve means arranged to effect a cyclic operation in each cycle of which said piston is moved through a power stroke by liquid from said pump and then said pump is vented and said cylinder connected to said exhaust passage, and an adjustable valve in said exhaust passage to regulate the release of liquid from said cylinder.

6. In combination, a driven shaft, a hydraulic pump delivering liquid at a substantially constant rate, and means operated by liquid from said pump for moving said driven shaft through a controlled aggregate extent in a given time, said means comprising a reciprocable member having a one-way drive connection with said driven shaft and yieldingly urged in a non-drive direction, an expansible chamber device operatively connected to move said reciprocable member in its driving direction during expansion and to be collapsed by the yieldingly urged return of said reciprocable member, automatic valve means arranged to effect expansion of said expansible chamber under hydraulic pressure from said pump and alternately to vent said pump and establish an exhaust passage from said chamber to permit its collapse, and an adjustable valve regulating oil flow through such exhaust passage.

7. In combination, a reciprocating member, a spring, means including a piston and cylinder and a generally constant discharge oil pump for moving said reciprocating member through a power stroke and stressing said spring, valve means operable upon the completion of said power stroke for venting the oil from said pump and connecting said piston and cylinder mechanism to a discharge passage, said spring being arranged to exert its stress reaction to collapse said piston and cylinder mechanism, an adjustable valve for regulating the rate of discharge from said piston and cylinder mechanism and thus the rate at which said spring is relieved of the stress put upon it by said piston and cylinder mechanism, and means operable upon the relief of said stress from said spring for connecting said piston and cylinder to said oil pump to cause a successive operation thereof to again move said reciprocating member through a power stroke and stress said spring.

8. A hydraulic power transmission including a housing containing a quantity of oil, an electric motor mounted externally thereof, a piston and cylinder mounted therein, an oil pump driven by said motor mounted in said housing adapted to force oil under pressure into said cylinder to actuate said piston, an oil intake extending from below the oil level to said pump, a shaft extending into said housing, a ratchet wheel keyed thereto, a lever adapted to be actuated by said piston during its power stroke for engaging and moving said ratchet in one direction, a spring in said housing connected with said lever for returning said piston through its exhaust stroke independently of said ratchet and shaft, an exhaust port for exhausting the oil from said cylinder during the return movement of the piston, means for controlling the movement of the piston within the cylinder to vary the duration of its cycle of movement, and an operating device for said means external of said housing.

ALBERT E. WEAVER.